US009089109B2

(12) United States Patent
Codos et al.

(10) Patent No.: US 9,089,109 B2
(45) Date of Patent: Jul. 28, 2015

(54) FORCE TRANSFER HARNESS AND METHOD

(71) Applicants: Daniel Codos, Warren, NJ (US);
Richard Codos, Warren, NJ (US)

(72) Inventors: Daniel Codos, Warren, NJ (US);
Richard Codos, Warren, NJ (US)

( * ) Notice: Subject to any disclaimer, the term of this patent is extended or adjusted under 35 U.S.C. 154(b) by 140 days.

(21) Appl. No.: 13/787,162

(22) Filed: Mar. 6, 2013

(65) Prior Publication Data

US 2014/0251235 A1 Sep. 11, 2014

(51) Int. Cl.
A01K 27/00 (2006.01)
A01K 15/02 (2006.01)

(52) U.S. Cl.
CPC ............. A01K 27/002 (2013.01); A01K 15/02 (2013.01)

(58) Field of Classification Search
CPC ... A01K 27/00; A01K 27/002; A01K 27/005; A01K 15/02; A01K 15/003; A01K 15/04; A01K 15/00; A01K 15/006; A01K 15/027; A01K 13/00; A61D 3/00; A61D 2003/003; A61D 2003/006; A61H 3/04; A61H 3/008; A61H 2003/046
USPC ......... 119/792, 793, 799, 712, 862, 174, 905, 119/758, 760, 762–763, 727, 722–726, 814, 119/816–820; D30/151–154, 199; 54/71, 54/72, 84, 1; 135/65–86
See application file for complete search history.

(56) References Cited

U.S. PATENT DOCUMENTS

| 1,531,052 | A | * | 3/1925 | Tuff | 119/801 |
| 3,215,117 | A | * | 11/1965 | Short | 119/727 |
| 5,924,388 | A | * | 7/1999 | Peeples | 119/814 |
| 6,408,799 | B1 | * | 6/2002 | Franck | 119/793 |
| 6,820,572 | B1 | * | 11/2004 | Parkes | 119/727 |
| 7,140,326 | B2 | * | 11/2006 | Jenny et al. | 119/770 |
| 7,281,363 | B2 | * | 10/2007 | Woerner | 54/37.1 |
| 7,549,398 | B2 | * | 6/2009 | Robinson et al. | 119/727 |
| 7,963,256 | B1 | * | 6/2011 | Horgan | 119/792 |
| 2006/0181042 | A1 | * | 8/2006 | Sawyer, III | 280/63 |

* cited by examiner

Primary Examiner — Joshua Huson

(57) ABSTRACT

A force transfer harness that utilizes the harness structure to redirect the handler's forces through the harness structure and into the underlying ground is provided. The harness creates a moving support for a handler. Through the act of the dog sitting, the associated dog and handler cause a change in the orientation of the harness legs, both fixed and moveable, and cause the moveable legs to be brought into an angular relationship with the fixed legs that allows the harness to form a support structure. After the dog sits, the harness legs are brought in contact with the ground, whereas previously they were hovering above the ground in a ready orientation. As a result, the dog's act of sitting enables the human to transfer his or her weight through the harness and into the ground. As a consequence, the need to use a highly trained large breed dog for motion assistance is eliminated since all of the handler's forces are directed through the harness structure and into the ground rather than through the dog's body.

6 Claims, 5 Drawing Sheets

FORCE TRANSFER HARNESS AND METHOD

BACKGROUND OF THE INVENTION

A specially trained mobility assistance dog with associated mobility harness, often referred to as a walker dog, is used to assist individuals that have some form of impairment that makes it difficult for them to walk unassisted. The aforementioned impairment is often the result of a birth defect, physical injury, mental injury, or underlying disease such as Parkinson's disease or arthritis. The walker dog is often fitted with a mobility harness that transfers the forces exerted by the human handler into the dog's front shoulders and front legs. By using the dog fitted with the mobility harness as a "portable walker", the handler gains assistance with balancing, gait, and their ability to ambulate.

Dogs of large stature are used as mobility assistance dogs due to the fact that the mobility harness transfers the forces exerted by the human handler into the dog's front shoulders and front legs. This facilitates the need for a large breed walker dog. The dog's girth and strength are the principal means used to provide stability and assistance to the handler. This is due to the fact that the dog needs to be able to support the handler's weight through its own front legs while additionally providing lateral support should the handler suddenly lose their balance. However, large breed dogs often don't fit well into many living environments. Additionally, about half of existing motion disabilities occur within the geriatric population. This group tends to have increased difficulties in caring for and living with larger breed dogs.

Given current harness designs, mobility assistance dogs require extensive training in paw placement and dog orientation relative to their handler's orientation, position, and gait. It is imperative that the walker dog keep his body parallel to that of the handler while keeping its front paws in perpendicular alignment to the handler. At the same time, the dog needs to be trained to walk when the handler is between strides in order to minimize the possibility of its front paws being out of alignment should the handler lose balance or start to fall. All of the aforementioned training is necessary since the dog must always be in a position to support the handler through its own shoulders and front quarters should the handler lose balance. All of the aforementioned coordination between the handler and the walker dog requires extensive training for the dog by itself, and the dog with the handler. At the same time, the temperament of the dog becomes an important factor in determining if the dog will ultimately be a successful walker dog. Additionally, training the dog to alert the handler to impending dangers such as oncoming traffic can be at odds with the dog's primary function of mobility assistance. This is due to the fact that a traffic danger warning is usually implemented by the dog moving to block the handler from entering the traffic zone which inherently puts the dog out of position relative to the handler for balance assistance. All of the aforementioned results in a dog selection and training regimen that is onerous to the dog and the handler. At the same time, the associated costs and time involved in training a walker dog limits their penetration within the disabled community.

Several different mobility assistance harnesses have been developed that allow for the transfer of forces into the dog's front quarters. As an example, Woerner, U.S. Pat. No. 7,281,363 describes a harness with a base member having a rigid platform covering a portion of the top side and a handle by which the handler's body forces are transferred to the dog's front quarters through the aforementioned platform.

Franck, U.S. Pat. No. 6,408,799 describes a harness that provides an improvement to the harness rigid handle allowing it to change orientation while still remaining rigid. A rigid handle is necessary to provide physical support and psychological assurance to the handler. However, Franck still requires that all forces are directed through the dog's front quarters.

Jenny, U.S. Pat. No. 7,140,326 describes a harness that comprises a rigid handle that is easily removable, via quick release joints. This patent provides an improvement over other rigid handle harnesses by providing for improved ergonomics with an easily removable rigid handle.

Woerner, Franck, and Jenny patents all provide for improvements over the standard rigid handle assistance dog harnesses. However, all of these patents still require that all of the handler's forces are directed through the harnesses into the dog's shoulders and front quarters. What is needed is a harness that is able to overcome the aforementioned limitation of directing all of the handler's forces through the dog's skeletal structure and thereby alleviate the need for a dog of large stature that requires extensive training.

SUMMARY OF THE INVENTION

The present invention provides a force transfer harness ("FTH") that utilizes the harness structure to redirect the handler's forces, through the harness structure, and into the underlying ground. This alleviates the need to use a large breed dog for motion assistance when using the invention since all of the handler's forces are directed through the harness structure into the ground rather than through the dog's shoulders and front quarters. At the same time, the invention is easily adaptable to a medium size dog without the need for extensive mobility training that is associated with current mobility assistance dogs and harnesses. The FTH provides the stability through its structure rather than via the dog's girth. Additionally, the FTH provides on demand support should the handler suddenly lose balance and need to use the invention as an instantaneous means for support. Since the invention transfers the handler forces through its own structure and into the underlying ground, the need for the dog to maintain 100% alignment with the handler is eliminated. Therefore, the training required to coordinate the dog's motion and gate with that of the handler is also greatly reduced.

The FTH takes advantage of a dog's ability to sit on a given command. Through movement of the FTH handle, a verbal command, or the dog's training associated with harness load sensing, the dog responds by going into a sitting posture when the handler needs support. As the dog sits, the invention forms a support to allow the disabled person to fully transfer their weight through the FTH structure to the underlying ground without redirecting any forces through the dog. The result is a mobility assistance device that can utilize a medium sized dog having little additional mobility assistance training that still provides full on demand support for a disabled handler.

DETAILED DESCRIPTION OF THE PREFERRED EMBODIMENTS

The present invention provides a FTH that utilizes the harness structure to redirect the handler's forces, through the harness structure, and into the underlying ground. As the harness handle is moved from its at rest position which has the handle near the dog's hind quarters, to a position that engages the hand of the human handler in which the handle position is roughly perpendicular to the underlying ground, a linkage between the handle and the harness moveable legs, causes a corresponding movement to occur in the harness support structure moveable legs. With the handle roughly perpendicular to the underlying ground the human handler is approximately astride the dog with the dog in a standing position. In this position the FTH moveable legs are partially descended towards the ground in a partially open inverted V shaped position while the harness fixed legs are parallel to the ground and parallel to the dog's back. At the same time the moveable harness legs are not in contact with the ground and therefore all forces exerted on the handle are being born by the dog. However, once the dog moves from the standing position to a sitting position the handle moves to its most forward position and the moveable legs, via an interconnecting linkage, correspondingly move to their maximum open position, make contact with the ground, and all forces are distributed through the handle to the legs and directly into the ground. In the sitting position the dog's hind quarter is now in contact with the ground, the FTH fixed legs are now in contact with the ground, and the moveable legs are also in contact with the ground. In this position the FTH is fully capable of supporting the entire human handler's weight without any of the weight being transferred into the dog's skeleton structure.

Through the act of sitting, the dog changes the orientation of the harness legs, both fixed and moveable legs, so that they are all now in contact with the ground, whereas previously they were hovering above the ground in a ready orientation. As a result, the dog's act of sitting enables the human handler to transfer his or her weight through the FTH and into the ground. Although the handle shaft remains approximately perpendicular to the ground as the dog transitions from a standing to a sitting posture, the angle between the harness handle and the fixed legs increases as the dog sits. This angular change moves the moveable legs by an interconnecting linkage and results in the angle between the fixed and moveable legs increasing so that a support structure is now formed between the fixed and moveable legs. Additionally, the fixed legs, which are parallel to the dog's back and terminate near the dog's hind quarters, are brought in contact with the ground.

Figure 1A:
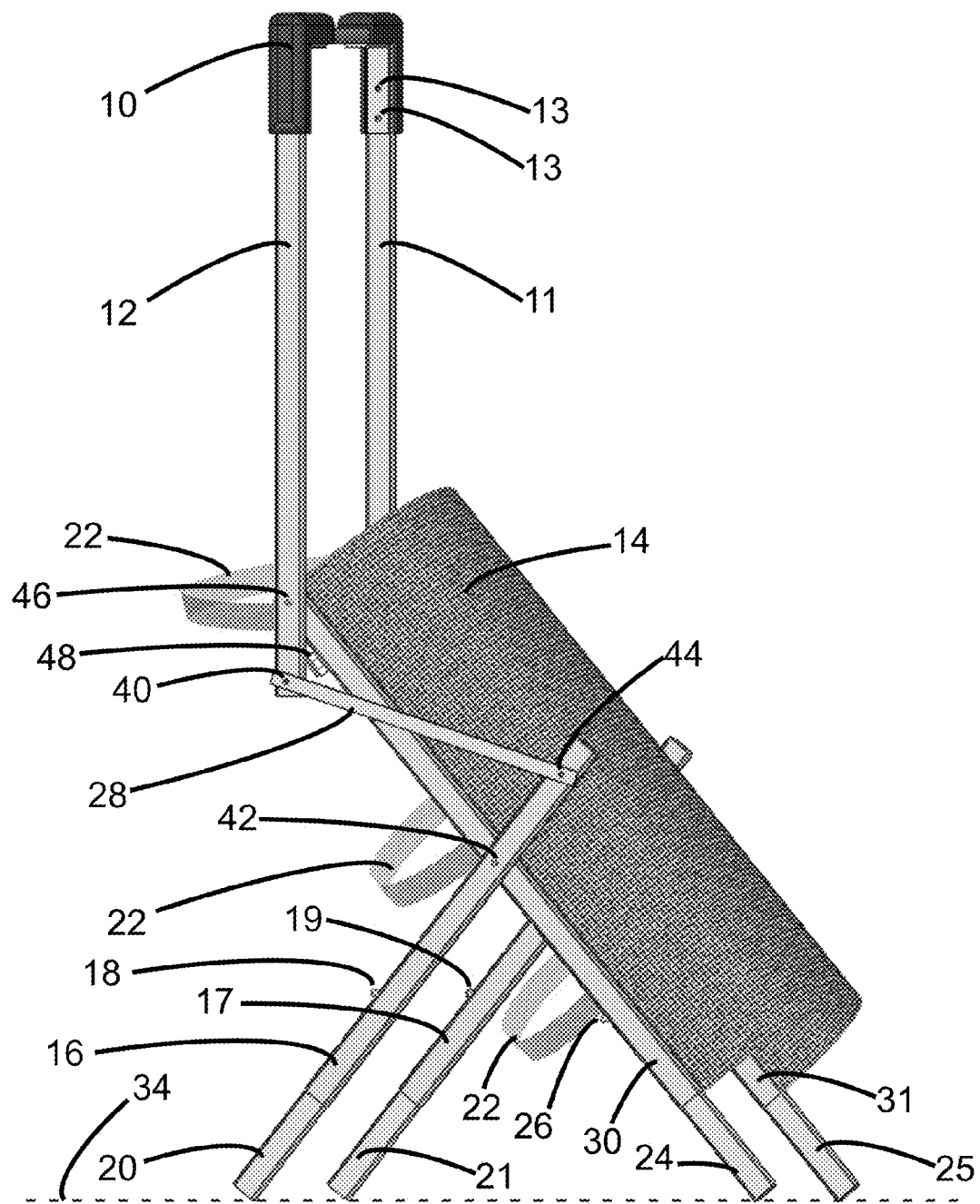
FIG. 1A is a front perspective view of the FTH shown in a orientation wherein the dog associated with the harness would be in a sitting position with the harness forming a support

Referring to FIG. 1A, the FTH is shown in a front perspective view that would correspond to a position where the dog (not shown) would be in a sitting position. The handle 10 is fastened to the right handle shaft 11 by mechanical fasteners 13. A mechanical fastener 13 may be a screw, alternatively a spring loaded pin, or some other mechanical fastener. Handle 10 is fastened to the left handle shaft 12 by mechanical fasteners not shown. The handle is adjustable to extend closer or further from the main harness body by refastening the handle 10 to alternative holes (not shown) in handle shaft 12 and handle shaft 11 via mechanical fasteners 13. Handle 10, which is fastened to handle shaft 11 and handle shaft 12 by fasteners 13, are collectively known as the harness handle. Handle shaft 12 is attached to the left fixed harness leg 30 by a pivot pin 46. The pivot pin 46 in this embodiment is a rivet, but can also be any mechanical fastener such as a lock pin, shoulder bolt, screw, or other mechanical fastener that fastens the two elements together while allowing the elements to pivot relative to one another. The forward movement of handle shaft 12 is limited by a stop block 48 that restricts the forward movement of handle shaft 12 relative to the left fixed harness leg 30.

Left fixed harness leg 30 is fastened to handle shaft 12 via pivot pin 46. At the same time left fixed harness leg 30 and right fixed harness leg 31 are each directly fastened to the harness body fabric 14. In this embodiment the fabric 14 is fastened by means of mechanical screw fasteners (not shown). Other means of fastening the body fabric 14 to the fixed harness legs could include, but not be limited to, a sewn pocket, glue, or other known fastening means. The harness body fabric 14 keeps all components of the FTH secured to and in alignment with the dog's body. In this embodiment the body fabric is composed of a 1680 denier woven nylon material that has structure and stiffness to keep the left fixed harness leg 30, and the right fixed harness leg 31, in parallel alignment to one another while conforming to the dog's body. Other modifications to the body fabric material and body fabric construction will readily appear to those who are skilled in the art. Such modifications may include different material construction and material types such as woven polyesters, knitted polyesters, and woven cottons to name a few. Three straps 22 which each have one end attached to the left fixed harness leg 30 and the other end to right fixed harness leg 3l are used to secure the harness body fabric 14 to the dog. In this embodiment the straps 22 are fastened by means of mechanical screw fasteners (not shown). Further to this embodiment the straps are secured to themselves by hook and loop fasteners. Other modifications to the above embodiment will readily appear to those who are skilled in the art. Such modifications may include, for instance, strap and buckle fasteners of different configurations. Additionally, a single larger fastening strap across the dog's stomach, instead of this embodiment's three straps 22 might be sufficient as a means to secure the FTH to the dog's body. The primary requirement of the straps 22, or alternative fastening means, is to secure the FTH to the dog's body without allowing for significant movement of the harness once it is attached. At the same time the straps 22 should allow for quick and easy application and removal of the harness to the dog without causing discomfort to the dog while the FTH is secured to the dog.

The left fixed leg 30 has a telescoping foot 24 that allows the effective length of the fixed leg 30 with foot 24 to be adjusted to different lengths. The telescoping foot 24 is adjusted to different lengths by depressing a spring detent pin 26 that engages different predrilled holes (not shown) in the fixed leg 30. In this way the total length of fixed leg 30 plus telescoping foot 24 can be adjusted to approximately match the back length of the associated dog whereas the bottom edge of the foot 24 approximately aligns with the dog's hind quarter. Other adjustment mechanisms for altering the length of the fixed leg might include, but not be limited to, a telescoping foot with a screw length adjustment to name one. Additionally, the spring detent spring 26 could be replaced by other mechanical means of securing the foot 24 to the fixed leg 30 such as a thumb screw to name one.

The left moveable leg 16 has a telescoping foot 20 that allows the effective length of the moveable leg 16 with foot 20 to be adjusted to different lengths. The telescoping foot 20 is adjusted to different lengths by depressing a spring detent pin 18 that engages different predrilled holes (not shown) in the moveable leg 16. In this way the total length of moveable leg 16 plus telescoping foot 20 can be adjusted so that the orientation of the harness handle is approximately perpendicular to the ground 34 when the dog is in a sitting position and the harness is transferring the human handler's weight into the ground 34. Right moveable leg 17 has a corresponding telescoping foot 21 that is also adjusted by depressing in a spring detent pin 19 that engages different predrilled holes (not shown) in the moveable leg 17. Other adjustment mechanisms for altering the length of the moveable leg might include, but not be limited to, a telescoping foot with a screw length adjustment to name one. Additionally, the spring detent pin 18 could be replaced by other mechanical means of securing the foot 20 to the moveable leg 16 such as a thumb screw to name one. The same apples to the spring detent pin 19 that could be replaced by other mechanical means of securing the foot 21 to the moveable leg 17 such as a thumb screw to name one.

The left moveable leg 16 is attached to the left fixed harness leg 30 by a pivot pin 42. The pivot pin 42 in this embodiment is a rivet, but can also be any mechanical fastener such as a lock pin, shoulder bolt, screw, or other mechanical fastener that fastens the two elements together while allowing the elements to pivot relative to one another. The left moveable leg 16 is attached to one end of the left linkage 28 by a pivot pin 44. The other end of the left linkage 28 is connected to the left handle shaft 12 by a pivot pin 40. The pivot pins 40 and 44 in this embodiment are rivets, but can also be any mechanical fasteners such as lock pins, shoulder bolts, screws, or other mechanical fasteners that fastens the elements together while allowing the elements to pivot relative to one another. As the left handle shaft 12 is moved in an arc relative to the left fixed leg 30, a corresponding movement occurs in the movable leg 16 via linkage 28.

Figure 1B:
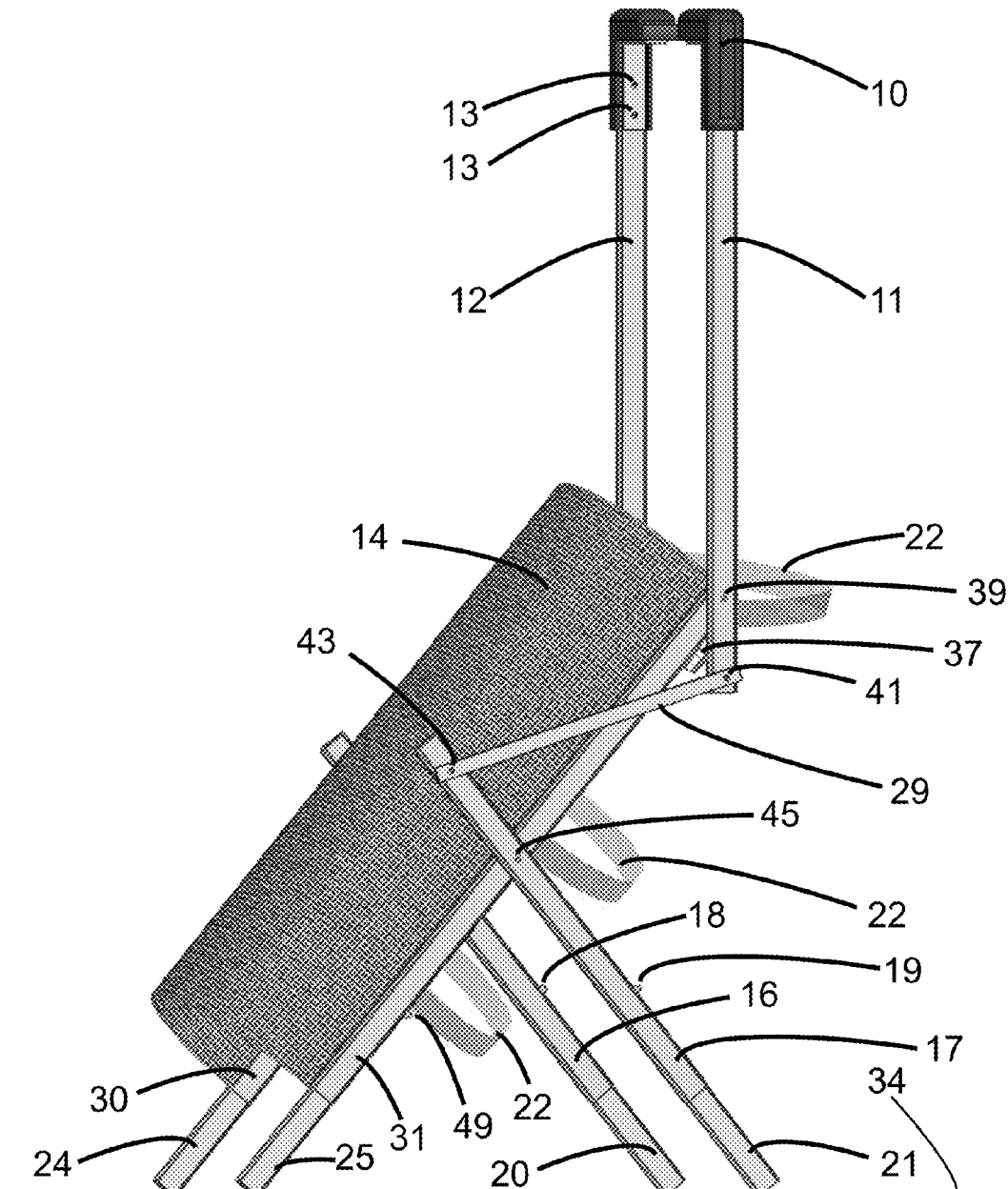
FIG. 1B is a rear perspective view of the FTH shown in a orientation wherein the dog associated with the harness would be in a sitting position with the harness forming a support

Referring to FIG. 1B, the FTH is shown in a rear perspective view that would correspond to a position where the dog (not shown) would be in a sitting position. In this view, we can see that right handle shaft 11 is attached to the right fixed harness leg 31 by a pivot pin 39. The pivot pin 39 in this embodiment is a rivet, but can also be any mechanical fastener such as a lock pin, shoulder bolt, screw, or other mechanical fastener that fastens the two elements together while allowing the elements to pivot relative to one another. The forward movement of handle shaft 11 is limited by a stop block 37 that restricts the forward movement of right handle shaft 11 relative to the right fixed harness leg 31. Consequently, the harness handle made up of handle 10, handle shaft 11 and handle shaft 12, is limited in forward movement by stop block 37 and stop block 48 (FIG. 1A). Additionally, since harness handle 10 is rigidly fastened to both handle shaft 11 and handle shaft 12 by fasteners 13, the entire harness handle moves as a single unit whose forward movement is limited by stop block 37 and simultaneously stop block 48 (FIG. 1A).

Right fixed harness leg 31 is fastened to handle shaft 11 via pivot pin 39. The right fixed leg 31 has a telescoping foot 25 that allows the effective length of the fixed leg 31 with foot 25 to be adjusted to different lengths. The telescoping foot 25 is adjusted to different lengths by depressing a spring detent pin 49 that engages different predrilled holes (not shown) in the fixed leg 31. In this way the total length of fixed leg 31 plus telescoping foot 25 can be adjusted to approximately match the back length of the associated dog whereas the bottom edge of the foot 25 approximately aligns with the dog's hind quarter. Other adjustment mechanisms for altering the length of the fixed leg might include, but not be limited to, a telescoping foot with a screw length adjustment to name one. Additionally, the spring detent spring 49 could be replaced by other mechanical means of securing the foot 25 to the fixed leg 31 such as a thumb screw to name one.

The right moveable leg 17 is attached to the right fixed harness leg 31 by a pivot pin 45. The pivot pin 45 in this embodiment is a rivet, but can also be any mechanical fastener such as a lock pin, shoulder bolt, screw, or other mechanical fastener that fastens the two elements together while allowing the elements to pivot relative to one another. The right moveable leg 17 is attached to one end of the right linkage 29 by a pivot pin 43. The other end of the right linkage 29 is connected to the right handle shaft 11 by a pivot pin 41. The pivot pins 43 and 41 in this embodiment are rivets, but can also be any mechanical fasteners such as lock pins, shoulder bolts, screws, or other mechanical fasteners that fastens the elements together while allowing the elements to pivot relative to one another. As the right handle shaft 11 is moved in an arc relative to the right fixed leg 31, a corresponding movement occurs in the movable leg 17 via linkage 29. Since harness handle 10 is rigidly fastened to both handle shaft 11 and handle shaft 12 by fasteners 13, the entire harness handle moves as a single unit whose forward movement is limited by stop block 37 and simultaneously stop block 48 (FIG. 1A), and the corresponding movement of right moveable leg 17 and left moveable leg 16 will occur at the same time, and right moveable leg 17 and left moveable leg 16 will be limited in movement by their corresponding linkages 29 and 28 (FIG. 1A).

Figure 2:
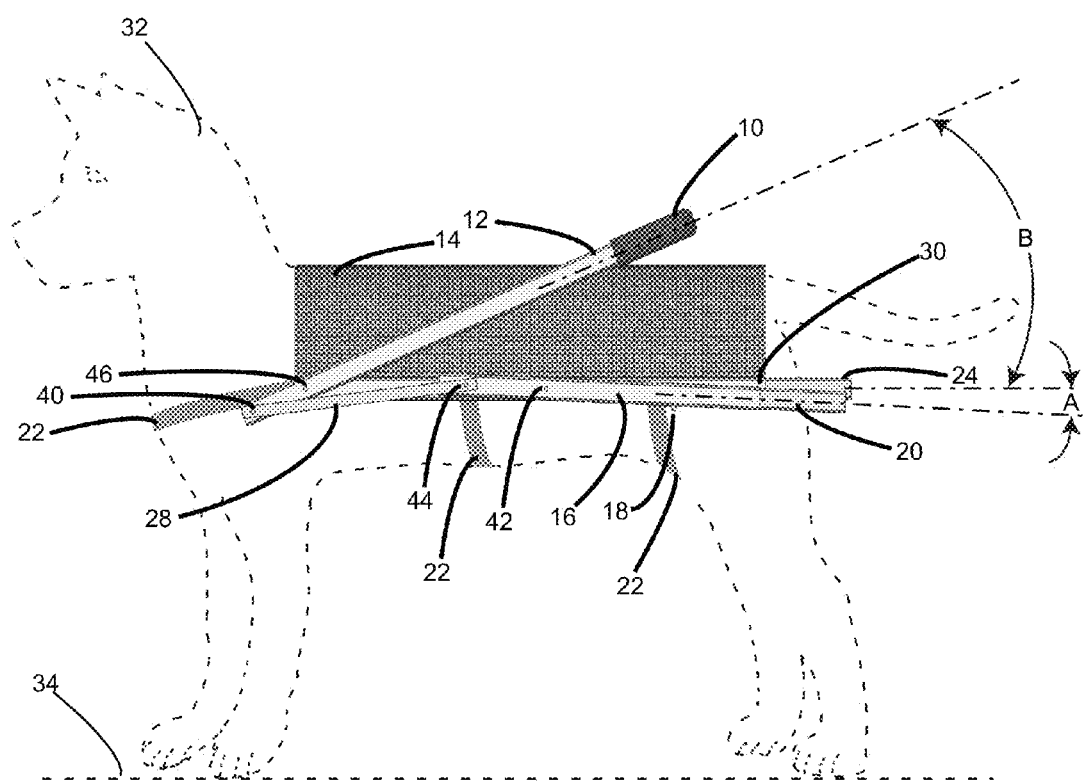
FIG. 2 is a front view of the FTH shown in a standby orientation where the harness handle is retracted down position

Referring to FIG. 2, a front view of the FTH is shown in a standby orientation where the harness handle is in a retracted down position and the dog is shown. The handle 10 is resting just above the harness body fabric 14 which is situated on the dog 32 back. Left moveable leg 16 is now forming an angle A with respect to left fixed leg 30. Right moveable leg 17 (FIG. 1B) is now forming an angle A with respect to right fixed leg 31 (FIG. 1B). At the same time, left handle shaft 12 is forming an angle B with respect to left fixed leg 30. Right handle shaft 11 (FIG. 1B) is forming an angle B with respect to right fixed leg 31 (FIG. 1B). The position of left moveable leg 16 is dictated by the position of the left handle shaft 12 and is brought to its position by the interconnection of the left handle shaft 12, and left moveable leg 16, via left linkage 28. Likewise, the position of right moveable leg 17 (FIG. 1B) is dictated by the position of the right handle shaft 11 (FIG. 1B) and is brought to its position by the interconnection of the right handle shaft 11 (FIG. 1B), and right moveable leg 17, via right linkage 29 (FIG. 1B). In this embodiment in the standby orientation shown, angle A is defined as 3.5 degrees and angle B is defined as 23 degrees. It should be clear to anyone skilled in the art that by making changes to linkage lengths and connection point locations that these angles can differ from the preferred embodiment. In this standby orientation the dog is able to sit, walk, or lay down with minimal interference from the FTH.

Figure 3:
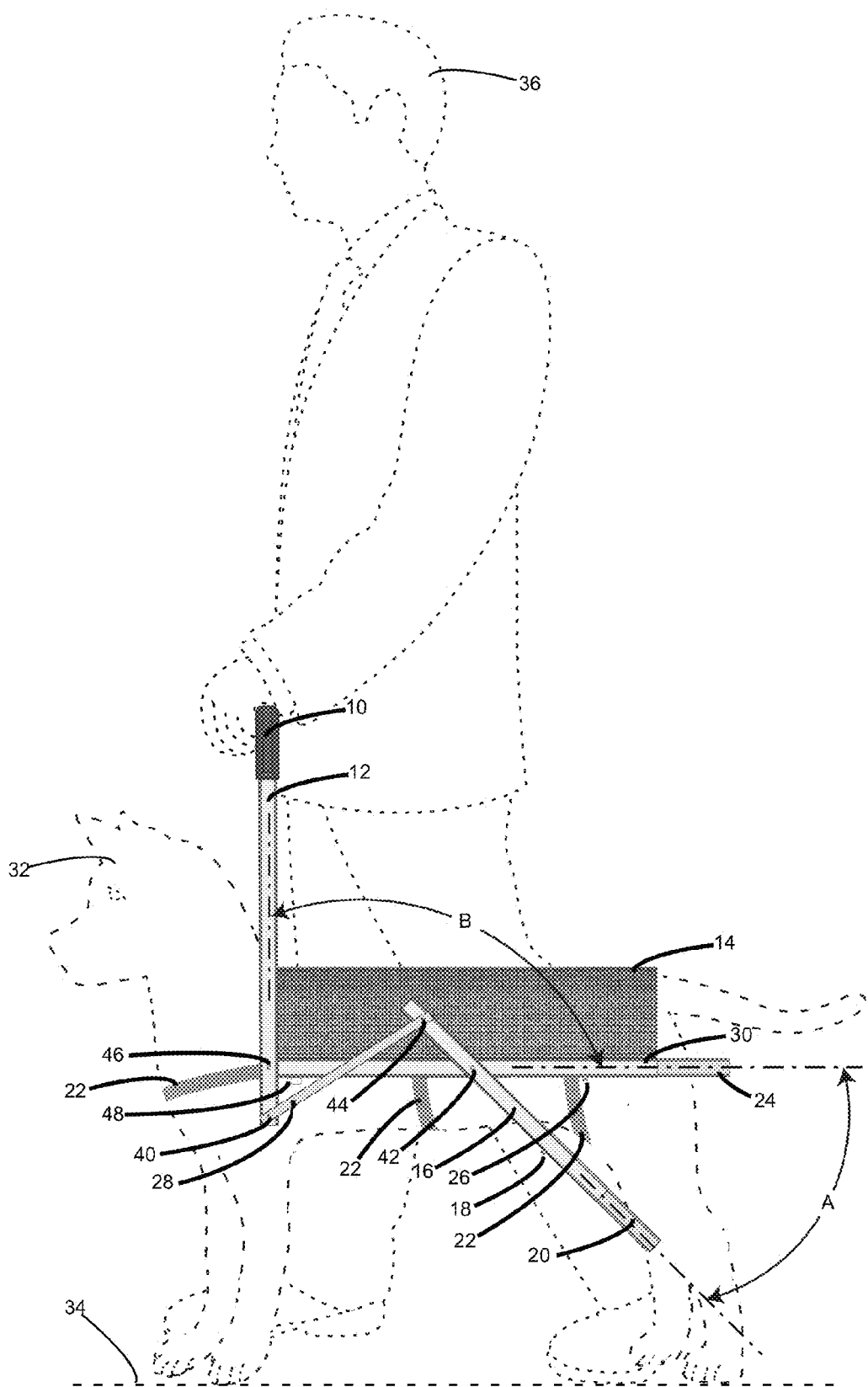
FIG. 3 is a front view of the FTH shown in an orientation wherein the dog associated with the harness would be in a walking position astride the human handler

Referring to FIG. 3 is a front view of the FTH shown in an orientation whereas the dog 32 associated with the harness would be in a walking position astride the human handler 36. The left handle shaft 12 is in the vertical position defined as being approximately perpendicular to the ground 34. The right handle shaft 11 (FIG. 1B) is in the vertical position defined as being approximately perpendicular to the ground 34. The left fixed leg 30 is approximately parallel to the ground 34 and in line with the back of the dog 32. The right fixed leg 31 (FIG. 1B) is approximately parallel to the ground 34 and in line with the back of the dog 32. The FTH is located on the dog 32 by having the harness body fabric 14 in contact with the body of the dog 32 and being held in place by the straps 22. Both the human 36 and the dog 32 have their legs in contact with the ground 34 and the human 36 is walking astride the dog 32. At the same time, the human 36 is holding onto the harness handle 10 with his or her associated hand. The position of the left moveable leg 16 is dictated by the position of the left handle shaft 12 and is brought to its position by the interconnection of the left handle shaft 12, and left moveable leg 16, via left linkage 28. The position of the right moveable leg 17 (FIG. 1B) is dictated by the position of the right handle shaft 11 (FIG. 1B) and is brought to its position by the interconnection of the right handle shaft 11 (FIG. 1B), and right moveable leg 17 (FIG. 1B), via right linkage 29 (FIG. 1B). In this embodiment in the walking position orientation shown, angle A is defined as 44 degrees and angle B is defined as 90 degrees. It should be clear to anyone skilled in the art that by making changes to linkage lengths and connection point locations that these angles can differ from the preferred embodiment. The angle A that is formed between the left moveable leg 16 and the left fixed leg 30 now forms a partial support formation between the aforementioned fixed leg 30 and moveable leg 16. The angle A that is formed between the right moveable leg 17 (FIG. 1B) and the right fixed leg 31 (FIG. 1B) now forms a partial support formation between the aforementioned fixed leg 31 (FIG. 1B) and moveable leg 17 (FIG. 1B). It should be further noted that neither telescoping foot 20 located on the moveable leg 16, telescoping foot 21 (FIG. 1B) located on the moveable leg 17 (FIG. 1B), telescoping foot 24 located at the end of the fixed leg 30, and telescoping foot 25 (FIG. 1B) located at the end of the fixed leg 31 (FIG. 1B) are not in contact with the ground 34. As a result, any forces that the human handler 36 is applying to the FTH are being born by the dog 32 in its front quarters. However, if the dog 32 goes from the walking orientation into a sitting posture, telescoping foot 20 located on the moveable leg 16, telescoping foot 21 (FIG. 1B) located on the moveable leg 17 (FIG. 1B), telescoping foot 24 located at the end of the fixed leg 30, and telescoping foot 25 (FIG. 1B) located at the end of the fixed leg 31 (FIG. 1B) would now be brought into contact with the ground 34 and all of the forces that the human handler 36 is applying to the FTH would now bypass the skeletal structure of dog 32 and be transferred through the FTH and into the ground 34. At the same time angle A and angle B as defined above would both increase in response to the dog going into a sitting posture.

Figure 4:
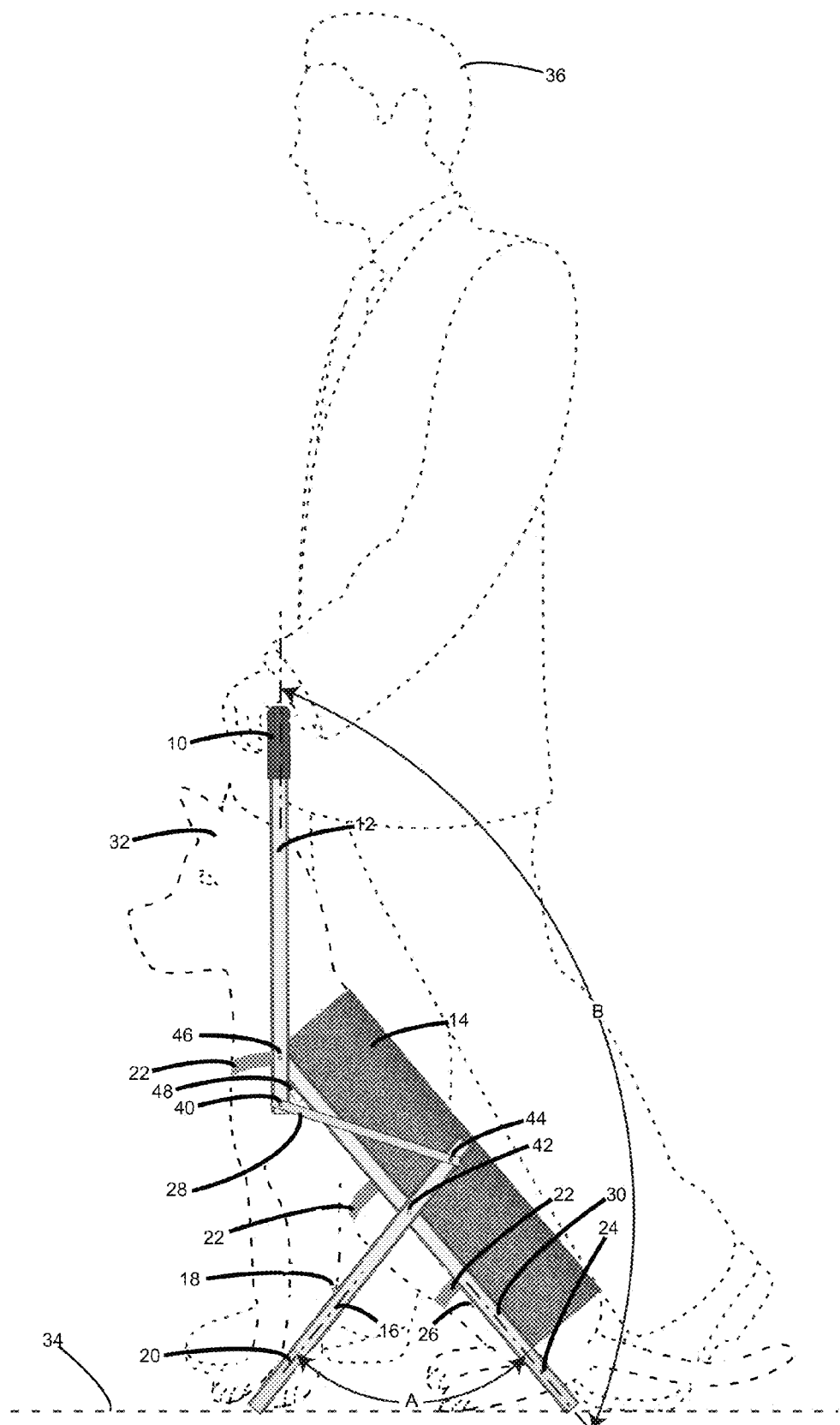
FIG. 4 is a front view of the FTH shown in a position wherein the dog associated with the harness would be in a sitting position with the harness forming a support and showing the dog in a sitting position astride the human handler

Referring to FIG. 4 is a front view of the FTH shown in an orientation whereas the dog 32 associated with the harness would be in a sitting position astride the human handler 36. The left handle shaft 12 is in the vertical position defined as being approximately perpendicular to the ground 34. The right handle shaft 11 (FIG. 1B) is in the vertical position defined as being approximately perpendicular to the ground 34. However, unlike the standing dog position of FIG. 3, the action of the dog sitting has increased the angle B to 139 degrees while angle A has increased to 77 degrees. Telescoping foot 20 located on the moveable leg 16, telescoping foot 21 (FIG. 1B) located on the moveable leg 17 (FIG. 1B), telescoping foot 24 located at the end of the fixed leg 30, and telescoping foot 25 (FIG. 1B) located at the end of the fixed leg 31 (FIG. 1B) are now all in contact with the ground 34. As a result, the forces that the human handler 36 is applying to the FTH are being transferred from the harness handle 10, into the left handle shaft 12 and right handle shaft 11 (FIG. 1B), then into the respective left fixed leg 30 and the right fixed leg 31 (FIG. 1B), and ultimately into the underlying ground 34 via the respective telescoping foot 24 located at the end of the fixed leg 30, and telescoping foot 25 (FIG. 1B) located at the end of the fixed leg 31 (FIG. 1B). At the same time, some of the forces are being transferred through the left moveable leg 16 and the right moveable leg 17 (FIG. 1B) and then into the underlying ground 34 via the respective telescoping foot 20 located at the end of the left moveable leg 16, and telescoping foot 21 (FIG. 1B) located at the end of the right moveable leg 17 (FIG. 1B). In the sitting position, the forward movement of left handle shaft 12 is limited by a stop block 48 that restricts the forward movement of left handle shaft 12 relative to the left fixed harness leg 30. Additionally, the forward movement of right handle shaft 11 (FIG. 1B) is limited by a stop block 37 (FIG. 1B) that restricts the forward movement of right handle shaft 11 (FIG. 1B) relative to the right fixed harness leg 31 (FIG. 1B). Consequently, the harness handle made up of handle 10, handle shaft 12 and handle shaft 11 (FIG. 1B), is limited in forward movement by stop block 48 and stop block 37 (FIG. 1B). Therefore, the forward movement of the left moveable leg 16 and the right moveable leg 17 (FIG. 1B) is constrained by the respective linkages 28 and 29 (FIG. 1B) connection to the respective left fixed leg 30 and right fixed leg 31 (FIG. 1B).

The invention claimed is:

1. A force transfer harness comprising:
   a handle attached to two handle shafts;
   a first fixed leg attached to a first handle shaft by a mechanical fastener that allows rotational movement between the first handle shaft and the first fixed leg;
   a second fixed leg parallel to the first fixed leg, a second handle shaft parallel to the first handle shaft, the second fixed leg attached to the second handle shaft by a mechanical fastener that allows rotational movement between the second handle shaft and the second fixed leg;
   a first moveable leg attached to the first fixed leg and secured to the first fixed leg by a mechanical fastener that allows rotational movement between the first fixed leg and the first moveable leg;
   a second moveable leg parallel to the first moveable leg and attached to the second fixed leg and secured to the second fixed leg by a mechanical fastener that allows rotational movement between the second fixed leg and the second moveable leg;
   one or more linkages that cause the first moveable leg to rotate away from the first fixed leg and the second moveable leg to rotate away from the second fixed leg as the handle is moved up, away and angularly forward relative to the first fixed leg and the second fixed leg;
   a means of securing the first fixed leg and the second fixed leg to a dog's body.

2. A force transfer harness according to claim 1, wherein each fixed leg forms a support with its respective moveable leg when the handle is moved to a forward position.

3. A force transfer harness according to claim 2, wherein the handle's forward position is limited by a position stop.

4. A force transfer harness according to claim 2, wherein the handle's forward motion is initiated by the dog transitioning from a standing to a sitting posture.

5. A force transfer harness according to claim 1, wherein, when in use, the fixed legs are positioned and located on the side of the dog by a harness body fabric.

6. A force transfer harness according to claim 5, wherein the body fabric is secured to the dog by one or more straps.

\* \* \* \* \*